United States Patent
Maghazachi et al.

(10) Patent No.: US 12,534,478 B2
(45) Date of Patent: Jan. 27, 2026

(54) PREVENTION, PROPHYLACTIC AND THERAPEUTIC TREATMENT OF AUTOIMMUNE DISEASES INCLUDING MULTIPLE SCLEROSIS USING NOVEL SMALL MOLECULES AND COMPOSITIONS THEREOF

(71) Applicant: University of Sharjah, Sharjah (AE)

(72) Inventors: Azzam A. Maghazachi, Sharjah (AE); Taleb Al-Tel, Sharjah (AE); Sarah Dhaiban, Sharjah (AE); Mena Al-Ain, Sharjah (AE); Noha Mousaad Elemam, Sharjah (AE); Srinivasulu Vunnam, Sharjah (AE)

(73) Assignee: University of Sharjah, Sharjah (AE)

( * ) Notice: Subject to any disclaimer, the term of this patent is extended or adjusted under 35 U.S.C. 154(b) by 0 days.

(21) Appl. No.: 18/244,159

(22) Filed: Sep. 8, 2023

(65) Prior Publication Data
US 2024/0002402 A1    Jan. 4, 2024

Related U.S. Application Data

(62) Division of application No. 17/122,537, filed on Dec. 15, 2020, now abandoned.

(51) Int. Cl.
*C07D 513/14* (2006.01)
*A61P 25/28* (2006.01)
*C07D 498/14* (2006.01)

(52) U.S. Cl.
CPC ............ *C07D 513/14* (2013.01); *A61P 25/28* (2018.01); *C07D 498/14* (2013.01)

(58) Field of Classification Search
CPC ...... A61P 25/28; C07D 498/14; C07D 513/14
USPC ..................................................... 514/229.5
See application file for complete search history.

(56) References Cited

PUBLICATIONS

Srinivasulu et al. Nature Communications (2018), 9(1), 1-14.*
Vunnam Srinivasulu, "Multidirectional desymmetrization of pluripotent building block en route to diastereoselective synthesis of complex nature-inspired scaffolds", Article, 2018, 1-14 vol. 9, Nature Communications.

* cited by examiner

*Primary Examiner* — Kahsay Habte
(74) *Attorney, Agent, or Firm* — DLA Piper LLP (US)

(57) ABSTRACT

The present invention relates to the prevention, prophylactic and therapeutic treatment of autoimmune diseases including but not limited to multiple sclerosis by administering novel small molecules to a subject in need thereof.

8 Claims, 15 Drawing Sheets

GFAP staining of Mouse Cerebellum

| Species | Reference body weight (kg) | Working weight range (kg) | Body surface area (m²) | To convert dose in mg/kg to dose in mg/m², multiply by $K_m$ | To convert animal dose in mg/kg to HED in mg/kg, either Divide animal dose by | Multiply animal dose by |
|---|---|---|---|---|---|---|
| Human | 60 | - | 1.62 | 37 | - | - |
| Mouse | 0.02 | 0.011-0.034 | 0.007 | 3 | 12.3 | 0.081 |
| Hamster | 0.08 | 0.047-0.157 | 0.016 | 5 | 7.4 | 0.135 |
| Rat | 0.15 | 0.08-0.27 | 0.025 | 6 | 6.2 | 0.162 |
| Ferret | 0.30 | 0.16-0.54 | 0.043 | 7 | 5.3 | 0.189 |
| Guinea pig | 0.40 | 0.208-0.700 | 0.05 | 8 | 4.6 | 0.216 |
| Rabbit | 1.8 | 0.90-3.0 | 0.15 | 12 | 3.1 | 0.324 |
| Dog | 10 | 5-17 | 0.50 | 20 | 1.8 | 0.541 |
| Monkeys (rhesus) | 3 | 1.4-4.9 | 0.25 | 12 | 3.1 | 0.324 |
| Marmoset | 0.35 | 0.14-0.72 | 0.06 | 6 | 6.2 | 0.162 |
| Squirrel monkey | 0.60 | 0.29-0.97 | 0.09 | 7 | 5.3 | 0.189 |
| Baboon | 12 | 7-23 | 0.60 | 20 | 1.8 | 0.541 |
| Micro pig | 20 | 10-33 | 0.74 | 27 | 1.4 | 0.730 |
| Mini pig | 40 | 25-64 | 1.14 | 35 | 1.1 | 0.946 |

FIG. 10

PREVENTION, PROPHYLACTIC AND THERAPEUTIC TREATMENT OF AUTOIMMUNE DISEASES INCLUDING MULTIPLE SCLEROSIS USING NOVEL SMALL MOLECULES AND COMPOSITIONS THEREOF

CROSS REFERENCE TO RELATED APPLICATION

This application is a divisional of U.S. patent application Ser. No. 17/122,537, filed Dec. 15, 2020, the contents of which are incorporated herein by reference.

TECHNICAL FIELD

The present invention relates to novel small molecules for prevention, prophylactic and treatment of autoimmune diseases, such as multiple sclerosis among others.

BACKGROUND

Multiple sclerosis (MS) is a chronic immune mediated and neuro-degenerative disease directed against central nervous system antigens. MS is a potentially disabling disease in which the immune system causes de-myelinization of the sheaths of nerve fibers, disrupting the signaling ability of parts of the nervous system. MS causes permanent neurological damage and has no apparent cure. Current available treatments of MS focus on reducing the frequency of relapses and prolong recovery period. There is a need for effective treatment or ideally for prevention of multiple sclerosis.

SUMMARY OF THE INVENTION

Provided are two novel compounds for the treatment, prophylactic and for prevention of autoimmune diseases, in particular MS.

In one embodiment of the present disclosure is provided the compound (8aS,14aS)-9,9-dimethyl-11,12-diphenyl-8a,14a-dihydro-8H,9H-benzo[5,6]chromeno[4,3-d]thiazolo[3,2-a]pyrimidine (SIMR-1281).

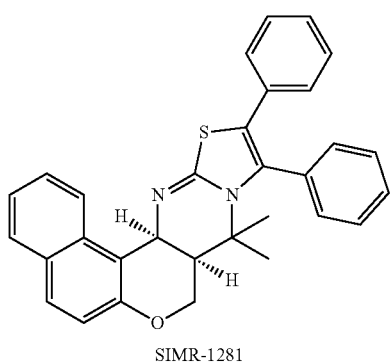

SIMR-1281

In another embodiment of the present disclosure is provided the compound (2aS,6aR,14bR)-2a-Methyl-6,6a,8,9,14,14b-hezahydro-1H-benzo[5',6'][1,4]oxazino[4',3':1,2][pyrido[3,4-b]indol-5(2aH)-one (SIMR-1707).

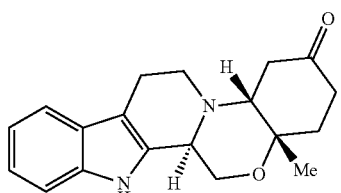

SIMR-1707

In another embodiment of the present disclosure, there is provided a pharmaceutical composition for use the prophylaxis of MS, the composition comprising a therapeutically effective amount of the compound SIMR-1281, or a pharmaceutically acceptable salt thereof, and one or more pharmaceutical excipients.

In yet another embodiment of the present disclosure, there is provided a pharmaceutical composition for use in the prophylaxis of MS, the composition comprising a therapeutically effective amount of the compound SIMR-1707, or a pharmaceutically acceptable salt thereof, and one or more pharmaceutical excipients.

In a preferred embodiment of the present disclosure, there is provided a pharmaceutical composition for use in treating MS, the composition comprising a therapeutically effective amount of the compound SIMR-1281, or a pharmaceutically acceptable salt thereof, and one or more pharmaceutical excipients.

In another preferred embodiment of the present disclosure, there is provided a pharmaceutical composition for use in treating MS, the composition comprising a therapeutically effective amount of the compound SIMR-1707, or a pharmaceutically acceptable salt thereof, and one or more pharmaceutical excipients.

In a most preferred embodiment of the present disclosure, there is provided a pharmaceutical composition for preventing MS, the composition comprising a therapeutically effective amount of the compound SIMR-1281, or a pharmaceutically acceptable salt thereof, and one or more pharmaceutical excipients.

In one embodiment of the present disclosure, there is provided a method of treating a subject afflicted by MS, by administering to a subject a therapeutically effective amount of compound SIMR-1281, or a pharmaceutically acceptable salt thereof, and one or more pharmaceutical excipients.

In one embodiment of the present disclosure, there is provided a method of treating a subject afflicted by MS, by administering to a subject a therapeutically effective amount of compound SIMR-1707, or a pharmaceutically acceptable salt thereof, and one or more pharmaceutical excipients.

In one embodiment of the present disclosure, there is provided a method for the prophylaxis of MS, by administering to a subject a therapeutically effective amount of compound SIMR-1281, or a pharmaceutically acceptable salt thereof, and one or more pharmaceutical excipients.

In one embodiment of the present disclosure, there is provided a method for the prophylaxis of MS, by administering to a subject a therapeutically effective amount of compound SIMR-1707, or a pharmaceutically acceptable salt thereof, and one or more pharmaceutical excipients.

In a preferred embodiment of the present disclosure, there is provided a method for preventing MS, by administering to a subject a therapeutically effective amount of compound SIMR-1281, or a pharmaceutically acceptable salt thereof, and one or more pharmaceutical excipients.

Compounds described in the present disclosure show significant therapeutic effects on experimental autoimmune encephalomyelitis mice model. In particular, these compounds demonstrated effects in various regimens, including prevention, prophylactic or therapeutic treatment. No other drug currently in the market used to treat MS patients has been examined for its efficacy in preventing the development of the disease. The compounds of the present disclosure have been examined for the efficacy in treating mice with EAE disease not only prophylactically or therapeutically, but also as preventive agents. The latter is a novel approach and, as indicated, has not been previously examined for any other drug currently in the market. Without being bound to any particularly theory, the advantage is believed to lie in the ability to prevent de-myelination or induce re-myelination of the sheaths of nerve fibers. So far, no disadvantages appeared. The results reported herein show these compounds can be useful for treatment of MS patients. Consequently, successful protocols can be translated for therapy of these patients.

Compositions featuring the above-mentioned compounds may be specially formulated for administration in solid or liquid form, including those adapted for the following: (1) oral administration, for example, drenches (aqueous or non-aqueous solutions or suspensions), tablets, e.g., those targeted for buccal, sublingual, and systemic absorption, boluses, powders, granules, pastes for application to the tongue; (2) parenteral administration, for example, by subcutaneous, intramuscular, intravenous or epidural injection as, for example, a sterile solution or suspension, or sustained-release formulation; (3) intravaginally or intrarectally, for example, as a pessary, cream or foam; (4) sublingually; (5) ocularly; (6) transdermally; or (7) nasally.

Wetting agents, emulsifiers and lubricants, such as sodium lauryl sulfate and magnesium stearate, as well as coloring agents, release agents, coating agents, sweetening, flavoring and perfuming agents, preservatives and antioxidants can also be present in the compositions.

Examples of pharmaceutically-acceptable antioxidants include: (1) water soluble antioxidants, such as ascorbic acid, cysteine hydrochloride, sodium bisulfate, sodium metabisulfite, sodium sulfite and the like; (2) oil-soluble antioxidants, such as ascorbyl palmitate, butylated hydroxyanisole (BHA), butylated hydroxytoluene (BHT), lecithin. propyl gallate, alpha-tocopherol, and the like; and (3) metal chelating agents, such as citric acid, ethylenediamine tetraacetic acid (EDTA), sorbitol, tartaric acid, phosphoric acid, and the like.

The formulations may conveniently be presented in unit dosage form and may be prepared by any methods well known in the art of pharmacy. The amount of compound which can be combined with a carrier material to produce a single dosage form will vary depending upon the subject being treated, the particular mode of administration. The amount of an active ingredient which can be combined with a carrier material to produce a single dosage form will usually be that amount of the compound which produces a therapeutic effect. Usually, out of one hundred percent, this amount will range from about 1 wt % to about 99 wt % of active ingredient, preferably from about 5 wt % to about 70 wt %, most preferably from about 10 wt % to about 30 wt %.

In certain embodiments, a formulation of the compound includes an excipient selected from the group consisting of cyclodextrins, liposomes, micelle forming agents, e.g., bile acids, and polymeric carriers, e.g., polyesters and polyanhydrides; and an active ingredient that may be the compound and/or one of its pharmaceutically acceptable derivatives. In certain embodiments, an aforementioned formulation renders orally bioavailable a compound or its derivative.

Methods of preparing these formulations or compositions include the step of bringing into association the compound with the carrier and, optionally, one or more accessory ingredients. Usually, the formulations are prepared by uniformly and intimately bringing into association a compound of the present invention with liquid carriers, or finely divided solid carriers, or both, and then, if necessary, shaping the product.

Liquid dosage forms for oral administration of the compound include pharmaceutically acceptable emulsions, microemulsions, solutions, suspensions, syrups and elixirs. In addition to the active ingredient, the liquid dosage forms may contain inert diluents commonly used in the art, such as, for example, water or other solvents, solubilizing agents and emulsifiers, such as ethyl alcohol, isopropyl alcohol, ethyl carbonate, ethyl acetate, benzyl alcohol, benzyl benzoate, propylene glycol, 1,3-butylene glycol, oils (in particular, cottonseed, groundnut, corn, germ, olive, castor and sesame oils), glycerol, tetrahydrofuryl alcohol, polyethylene glycols and fatty acid esters of sorbitan, and mixtures thereof.

Besides inert diluents, the oral compositions can also include adjuvants such as wetting agents, emulsifying and suspending agents, sweetening, flavoring, coloring, perfuming and preservative agents. Suspensions, in addition to the active compounds, may contain suspending agents as, for example, ethoxylated isostearyl alcohols, polyoxyethylene sorbitol and sorbitan esters, microcrystalline cellulose, aluminum metahydroxide, bentonite, agar-agar and tragacanth, and mixtures thereof.

Formulations of the invention suitable for oral administration may be in the form of capsules, cachets, pills, tablets, lozenges (using a flavored basis, usually sucrose and acacia or tragacanth), powders, granules, or as a solution or a suspension in an aqueous or non-aqueous liquid, or as an oil-in-water or water-in-oil liquid emulsion, or as an elixir or syrup, or as pastilles (using an inert base, such as gelatin and glycerin, or sucrose and acacia) and/or as mouth washes and the like, each containing a predetermined amount of a compound of the present invention as an active ingredient. A formulation of the compound may also be administered as a bolus, electuary or paste.

In solid dosage forms of the invention for oral administration (capsules, tablets, pills, dragees, powders, granules and the like), the active ingredient is mixed with one or more pharmaceutically-acceptable carriers, such as sodium citrate or dicalcium phosphate, and/or any of the following: (1) fillers or extenders, such as starches, lactose, sucrose, glucose, mannitol, and/or silicic acid; (2) binders, such as, for example, carboxymethylcellulose, alginates, gelatin, polyvinyl pyrrolidone, sucrose and/or acacia; (3) humectants, such as glycerol; (4) disintegrating agents, such as agar-agar, calcium carbonate, potato or tapioca starch, alginic acid, certain silicates, and sodium carbonate; (5) solution retarding agents, such as paraffin; (6) absorption accelerators, such as quaternary ammonium compounds; (7) wetting agents, such as, for example, acetyl alcohol, glycerol monostearate, and non-ionic surfactants; (8) absorbents, such as kaolin and bentonite clay; (9) lubricants, such a talc, calcium stearate, magnesium stearate, solid polyethylene glycols, sodium lauryl sulfate, and mixtures thereof; and (10) coloring agents. In the case of capsules, tablets and pills, the pharmaceutical compositions may also include buffering agents. Solid compositions of a similar type may also be employed as fillers in soft and hard-shelled gelatin capsules using such excipients as lactose or milk sugars, as well as high molecular weight polyethylene glycols and the like.

A tablet may be made by compression or molding, optionally with one or more accessory ingredients. Compressed tablets may be prepared using binder (for example, gelatin or hydroxypropylmethyl cellulose), lubricant, inert diluent, preservative, disintegrant (for example, sodium starch glycolate or cross-linked sodium carboxymethyl cellulose), surface-active or dispersing agent. Molded tablets may be made by molding in a suitable machine a mixture of the powdered compound moistened with an inert liquid diluent.

The tablets, and other solid dosage forms of the pharmaceutical compositions of the present invention, such as dragees, capsules, pills and granules, may optionally be scored or prepared with coatings and shells, such as enteric coatings and other coatings well known in the pharmaceutical-formulating art. They may also be formulated so as to provide slow or controlled release of the active ingredient therein using, for example, hydroxypropylmethyl cellulose in varying proportions to provide the desired release profile, other polymer matrices, liposomes and/or microspheres. They may be formulated for rapid release, e.g., freeze-dried. They may be sterilized by, for example, filtration through a bacteria-retaining filter, or by incorporating sterilizing agents in the form of sterile solid compositions which can be dissolved in sterile water, or some other sterile injectable medium immediately before use. These compositions may also optionally contain opacifying agents and may be of a composition that they release the active ingredient(s) only, or preferentially, in a certain portion of the gastrointestinal tract, optionally, in a delayed manner. Examples of embedding compositions which can be used include polymeric substances and waxes. The active ingredient can also be in micro-encapsulated form, if appropriate, with one or more of the above-described excipients.

The tablets, and other solid dosage forms of the formulation of the compound, such as dragees, capsules, pills and granules, may optionally be scored or prepared with coatings and shells, such as enteric coatings and other coatings well known in the pharmaceutical-formulating art. They may also be formulated so as to provide slow or controlled release of the active ingredient therein using, for example, hydroxypropylmethyl cellulose in varying proportions to provide the desired release profile, other polymer matrices, liposomes and/or microspheres. They may be formulated for rapid release, e.g., freeze-dried. They may be sterilized by, for example, filtration through a bacteria-retaining filter, or by incorporating sterilizing agents in the form of sterile solid compositions which can be dissolved in sterile water, or some other sterile injectable medium immediately before use. These compositions may also optionally contain opacifying agents and may be of a composition that they release the active ingredient(s) only, or preferentially, in a certain portion of the gastrointestinal tract, optionally, in a delayed manner. Examples of embedding compositions which can be used include polymeric substances and waxes. The active ingredient can also be in micro-encapsulated form, if appropriate, with one or more of the above-described excipients.

Formulations of the pharmaceutical compositions of the compound for rectal or vaginal administration may be presented as a suppository, which may be prepared by the compound with one or more suitable nonirritating excipients or carriers comprising, for example, cocoa butter, polyethylene glycol, a suppository wax or a salicylate, and which is solid at room temperature, but liquid at body temperature and, therefore, will melt in the rectum or vaginal cavity and release the active compound.

Dosage forms for the topical or transdermal administration of the compound include powders, sprays, ointments, pastes, creams, lotions, gels, solutions, patches and inhalants. The extract may be mixed under sterile conditions with a pharmaceutically-acceptable carrier, and with any preservatives, buffers, or propellants which may be required. The ointments, pastes, creams and gels may contain, in addition to an extract, excipients, such as animal and vegetable fats, oils, waxes, paraffins, starch, tragacanth, cellulose derivatives, polyethylene glycols, silicones, bentonites, silicic acid, talc and zinc oxide, or mixtures thereof.

Powders and sprays can contain, in addition to an extract, excipients such as lactose, talc, silicic acid, aluminum hydroxide, calcium silicates and polyamide powder, or mixtures of these substances. Sprays can additionally contain customary propellants, such as chlorofluorohydrocarbons and volatile unsubstituted hydrocarbons, such as butane and propane.

Transdermal patches have the added advantage of providing controlled delivery of the compound to the body. Such dosage forms can be made by dissolving or dispersing an extract in the proper medium. Absorption enhancers can also be used to increase the flux of the extract or dispersing the extract in a polymer matrix or gel.

Pharmaceutical compositions suitable for parenteral administration include one or more components of the compound in combination with one or more pharmaceutically-acceptable sterile isotonic aqueous or nonaqueous solutions, dispersions, suspensions or emulsions, or sterile powders which may be reconstituted into sterile injectable solutions or dispersions just prior to use, which may contain sugars, alcohols, antioxidants, buffers, bacteriostats, solutes which render the formulation isotonic with the blood of the intended recipient or suspending or thickening agents.

These compositions may also contain adjuvants such as preservatives, wetting agents, emulsifying agents and dispersing agents. Prevention of the action of microorganisms upon the subject compounds may be ensured by the inclusion of various antibacterial and antifungal agents, for example, paraben, chlorobutanol, phenol sorbic acid, and the like. It may also be desirable to include isotonic agents, such as sugars, sodium chloride, and the like into the compositions. In addition, prolonged absorption of the injectable pharmaceutical form may be brought about by the inclusion of agents which delay absorption such as aluminum monostearate and gelatin.

Regardless of the route of administration selected, the compound may be formulated into pharmaceutically-acceptable dosage forms by conventional methods known to those of skill in the art. The compound may be formulated for administration in any convenient way for use in human or veterinary medicine, by analogy with other pharmaceuticals.

METHODS OF MS TREATMENT

The above compound compositions may be used in novel therapeutic methods of treatment in MS patients. The methods include administering to a subject an effective amount of a pharmaceutical compound composition. In representative embodiments, the subject suffers from autoimmune diseases. In specific embodiments, the autoimmune diseases is MS.

The above compounds can be used as a prophylactic of MS and for treatment of MS. Compound SIMR-1281 can be used for prevention of MS.

The phrase "effective amount" indicates the amount of the compound which is effective to treat any symptom or aspect of MS. Effective amounts can be determined routinely. Further guidance on dosages and administration regimens is provided below.

The term "treatment" is used conventionally, e.g. the management or care of a subject for the purpose of Combating, alleviating, reducing, relieving, improving, etc., one or more of the symptoms associated with MS. Administering effective amounts of the compound can treat one or more aspects of MS, including, but not limited to, reducing demyelination: causing re-myelination; reducing disease progression; stabilizing the disease; prolonging patient survival; enhancing patient's quality of life; reducing adverse symptoms associated with MS; and reducing the frequency, severity, intensity, and/or duration of any of the aforementioned aspects.

The term "subject" in accordance with the present invention, includes, e.g., mammals, such as dogs, cats, horses, rats, Mice, monkeys, and humans.

As anticipated above, the compound may be administered by any appropriate route, for example orally, parenterally, topically, or rectally. It will be appreciated that the preferred route may vary with, for example, the condition of the recipient of the compound. In certain embodiments, the extract may be especially suitable for the preparation of pharmaceuticals for intravenous administration, such as intravenous injection or infusion, provided that it does not contain components with serum-precipitating and/or hemagglutinating properties which disturb such an application. The extract may therefore be provided in the form of ampoule preparations which are directed to intravenous administration. In still other embodiments, the method comprises systemic administration of a subject composition to a subject.

In certain embodiments, the two compounds of the present invention, SIMR 1281 and SIMR-1707 may be compounded together in the same unitary pharmaceutical composition including both entities. Alternatively, the compounds above may be administered separately in separate pharmaceutical compositions.

Exemplary doses of the compound in the range from about 0.001, 0.01, 0.1, 0.5, 1, 10, 15, 20, 25, 50, 100, 200, 300, 400, 500, 600, or 750 to about 1000 mg/day per kg body weight of the subject. In certain embodiments, the dose of the compound will typically be in the range of about 100 mg/day to about 1000 mg/day per kg body weight of the subject, specifically in the range of about 200 mg/day to about 750 mg/day per kg, and more specifically in the range of about 250 mg/day to about 500 mg/day per kg. In an embodiment, the dose is in the range of about 50 mg/day to about 250 mg/day per kg. In a further embodiment, the dose in the range of about 100 mg/day to about 200 mg/day per kg. In an embodiment, the dose is in the range of about 15 mg/day to 60 mg/day per kg. In a further embodiment, the dose is in the range of about 20 mg/day to 50 mg/day per kg. In an additional embodiment, the dose is in the range of about 25 mg/day to 45 mg/day per kg.

The combined use of the compounds may reduce the required dosage for any individual component because the onset and duration of effect of the different components may be complementary. In such combination therapies, the different active agents may be delivered together or separately, and simultaneously or at different times within the day.

The data obtained from cell culture assays and animal studies may be used in formulating a range of dosage for use in humans. For example, effective dosages achieved in one animal species may be extrapolated for use in another animal, including humans, as illustrated in the conversion table of FIG. 9 where human equivalent dose (HED) dosage factors based on body surface area of other species are reported. [1]. The dosage of any supplement, or alternatively of any components therein, lies preferably within a range of circulating concentrations that include the $ED_{50}$ with little or no toxicity. The dosage may vary within this range depending upon the dosage form employed and the route of administration utilized. For the compound or combinations of the compound and other chemotherapeutic agents, the therapeutically effective dose may be estimated initially from cell culture assays. A dose may be formulated in animal models to achieve a circulating plasma concentration range that includes the $IC_{50}$ (i.e., the concentration of the test compound which achieves a half-maximal inhibition of symptoms) as determined in cell culture. Such information may be used to more accurately determine useful doses in humans. Levels in plasma may be measured, for example, by high performance liquid chromatography.

BRIEF DESCRIPTION OF THE FIGURES

The invention can be better understood with reference to the following figures and description.

FIG. 10 illustrates human equivalent (HED) dose calculation based on body surface area.

DEFINITIONS

Figure 1:
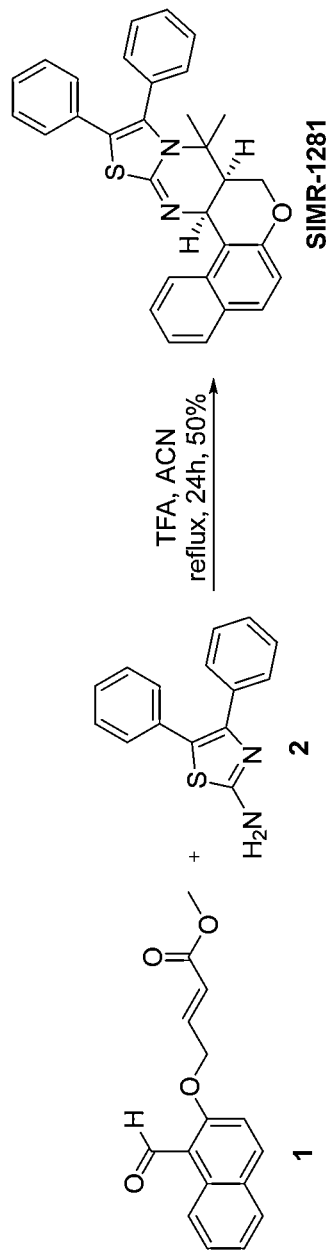
FIG. 1 illustrates the synthesis of compound SIMR-1281.
Figure 2:
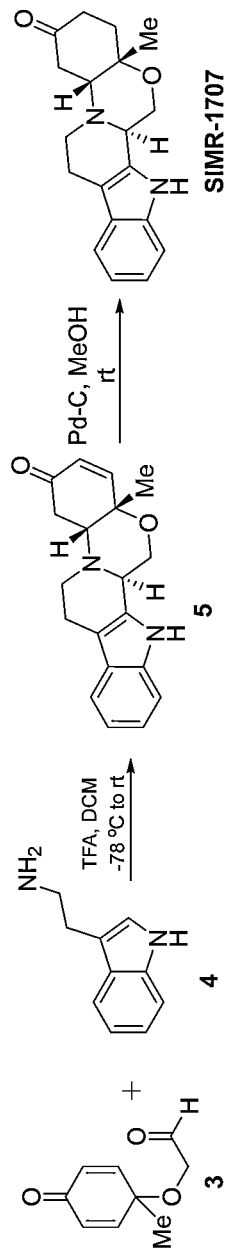
FIG. 2 illustrates the synthesis of compound SIMR-1707.

As used in this description and the accompanying claims, the following terms shall have the meanings indicated, unless the context otherwise requires:

As used herein, "treatment" is understood to refer to the administration of a drug or drugs to a patient suffering from MS.

As used herein, the term "therapeutically effective amount" means that amount of a drug or pharmaceutical agent that will elicit the biological or medical response of a tissue, system, animal or human that is being sought, for instance, by a researcher or clinician. Furthermore, the term "therapeutically effective amount" means any amount which, as compared to a corresponding subject who has not received such amount, results in improved treatment, healing, prevention, or amelioration of a disease, disorder, or side effect, or a decrease in the rate of advancement of a disease or disorder. The term also includes within its scope amounts effective to enhance normal physiological function.

Synthesis of the Compounds

Chemical reagents and anhydrous solvents were purchased from Sigma-Aldrich and were used without further purification. TLC analysis was performed with silica gel plates (0.25 mm, E. Merck, 60 $F_{254}$) using iodine and a UV lamp for visualization. $^1H$ and $^{13}C$ NMR experiments were performed on a 500 MHz instrument. Chemical shifts are reported in parts per million (ppm) downstream from the internal tetramethylsilane standard. Spin multiplicities are described as s (singlet), d (doublet), dd (double doublets), t (triplet), (td) triple doublets or m (multiplet). Coupling constants are reported in Hertz (Hz). ESI mass spectrometry was performed on a Q-TOF high-resolution mass spectrometer or Q-TOF Ultim LC-MS.

Synthesis of (8aS,14aS)-9,9-dimethyl-11,12-diphenyl-8a,14a-dihydro-8H,9H-benzo[5,6]chromeno[4,3-d]thiazolo[3,2-a]pyrimidine (SIMR-1281)

Methyl (E)-4-((1-formylnaphthalen-2-yl)oxy)but-2-enoate (1, 0.6 mmol) and 4,5-diphenylthiazol-2-amine (2, 0.5 mmol) were mixed in ACN (5 mL) at rt. Then, TFA (1.0 mmol) was added dropwise and refluxed for 24 h. After completion of the reaction, ACN and excess TFA was removed under vacuum and concentrated to dryness. The crude material was triturated using a mixture of EtOAc and diethyl ether in different ratios to get SIMR-1281 as a white solid.

Spectral Data of the Compound SIMR-1281

118 mg (50% yield). $^1H$ NMR (500 MHz, $CDCl_3$) δ 8.19 (d, J=8.4 Hz, 1H), 7.79 (t, J=7.6 Hz, 2H), 7.68 (t, J=7.5 Hz, 1H), 7.58-7.52 (m, 3H), 7.44 (dd, J=9.7, 5.4 Hz, 2H), 7.33 (d, J=7.6 Hz, 1H), 7.21 (dt, J=22.4, 7.2 Hz, 3H), 7.06 (d, J=9.0 Hz, 1H), 7.01 (d, J=7.2 Hz, 2H), 5.51 (d, J=3.1 Hz, 1H), 4.51 (dd, J=10.8, 2.2 Hz, 1H), 4.09 (t, J=11.5 Hz, 1H), 2.33 (dt, J=12.0, 3.5 Hz, 1H), 1.89 (s, 3H), 1.20 (s, 3H). $^{13}C$ NMR (125 MHz, $CDCl_3$) δ 162.5, 151.8, 134.2, 132.5, 132.2, 131.7, 131.5, 130.8, 130.3, 129.3, 129.1, 128.9, 128.7, 128.6, 128.0, 124.5, 122.3, 121.7, 117.8, 117.7, 109.1, 61.55, 61.10, 43.62, 41.23, 30.81, 27.05. HRMS (ESI-TOF): m/z calcd for $C_{31}H_{27}N_2OS$ 475.1844, found 475.1004 $[M+H]^+$. [16]

Synthesis of (2aS,6aR,14bR)-2a-Methyl-6,6a,8,9,14,14b-hexahydro-1H-benzo[5',6'][1,4]oxazino[4',3':1,2]pyrido[3,4-b]indol-5(2aH)-one (SIMR-1707)

Aldehyde (3, 0.5 mmol) was dissolved in DCM (2 mL) and a solution of tryptamine (4, 0.5 mmol) in DCM (2.0 mL) was added dropwise at −78° C. Then, a solution of TFA (1.0 mmol) in DCM (1 mL) was added dropwise at −78° C. and slowly warmed to room temperature and stirring was continued for 2-4 h. After completion, the reaction mixture was diluted with DCM (30 mL) and washed with saturated sodium bicarbonate solution (2×20 mL). The organic layer was separated, dried over $Na_2SO_4$ and concentrated under vacuum. The crude was purified on flash chromatography, using EtOAc/hexane as an eluent to produce compound 5.

Spectral Data of the Compound 5

White solid, 80 mg, 52% yield; mp: 217-219° C.; $^1H$ NMR (500 MHz, $CDCl_3$): δ 7.95 (s, 1H), 7.52 (d, J=7.7 Hz, 1H), 7.36 (d, J=8.0 Hz, 1H), 7.23-7.17 (m, 1H), 7.17-7.12 (m, 1H), 6.70 (d, J=10.6 Hz, 1H), 6.13 (d, J=10.6 Hz, 1H), 4.27-4.14 (m, 2H), 4.10-4.01 (m, 1H), 3.32 (d, J=4.4 Hz, 2H), 3.09-2.93 (m, 3H), 2.72 (d, J=14.9 Hz, 1H), 2.64 (dd, J=16.0, 3.5 Hz, 1H), 1.51 (s, 3H); $^{13}C$ NMR (125 MHz, $CDCl_3$): δ $^{13}C$ NMR (125 MHz, $CDCl_3$) δ 198.9, 151.4, 136.1, 130.8, 129.9, 127.3, 121.9, 119.7, 118.1, 111.0, 109.7, 72.2, 63.5, 59.0, 52.1, 48.0, 46.1, 23.6, 19.3; HRMS (m/z): $[M+H]^+$ calcd. for $C_{19}H_{21}N_2O_2$, 309.1603, found 309.1607.

Compound (5, 0.2 mmol) was dissolved in methanol (1.0 mL) and 10 wt % Pd/C (5 mol %) was added and stirring was continued under hydrogen atmosphere for 3-4 hr at rt. After completion, the reaction mixture was filtered through a celite pad and the filtrate was concentrated. The crude was purified on flash chromatography, using EtOAc in hexane as an eluent to produce the title compound SIMR-1707.

Spectral Data of the Compound SIMR-1707

Off-white solid, 57 mg, 92% yield; mp: 236-238° C.; $^1H$ NMR (500 MHz, $CDCl_3$): δ 7.74 (s, 1H), 7.49 (d, J=7.7 Hz, 1H), 7.32 (d, J=7.9 Hz, 1H), 7.16 (t, J=7.4 Hz, 1H), 7.11 (t, J=7.3 Hz, 1H), 4.17-4.05 (m, 2H), 3.89 (t, J=10.6 Hz, 1H), 3.13-3.02 (m, 2H), 3.01-2.91 (m, 1H), 2.90-2.81 (m, 2H), 2.81-2.67 (m, 2H), 2.44 (d, J=9.2 Hz, 1H), 2.19 (d, J=11.9 Hz, 2H), 1.80-1.71 (m, 1H), 1.49 (s, 3H); $^{13}C$ NMR (125 MHz, $CDCl_3$): δ 211.7, 136.4, 131.0, 127.1, 121.9, 119.8, 118.3, 111.0, 109.7, 72.2, 64.6, 64.5, 49.8, 49.3, 36.7, 36.6, 35.8, 22.7, 22.1. HRMS (m/z): $[M+H]^+$ calcd. for $C_{19}H_{23}N_2O_2$, 311.1759, found 311.1755. [15]

EXPERIMENTAL EXAMPLES

Prevention, Prophylactic or Therapeutic Treatment of MS Using Novel Small Molecules Experimental Parameters A study was conducted using novel compounds SIMR-1281 and SIMR-1707 as disease modifying therapies for multiple sclerosis (MS) using experimental autoimmune encephalomyelitis (EAE) model. The above compounds were utilized as preventive, prophylactic or therapeutic drugs for MS. The evaluation of the effects of SIMR-1281 and SIMR-1707 was done through measuring the EAE clinical scores, body weight changes, and examining the histological features of the EAE untreated mice and comparing them to the treated mice. As a control, was used Rituximab (RTX), which has been used as an off-label drug for MS patients and EAE mice [2-12]. The results show a significant reduction in the clinical score severity and clinical features in the mice treated with SIM-1281 and SIMR-1707 compounds.

Experimental Procedures

The basic experimental approaches to test the efficacy of the compounds in the EAE model were done using the methodologies developed in our laboratory [2, 13, 14]. EAE disease was induced in 4-6 weeks SJL female mice using 200 μg PLP peptide emulsified in complete Freund's adjuvant (CFA) containing 1 mg heat-killed *Mycobacterium tuberculosis*, injected at four sites in the right and left flanks. Following each injection, 200 ng of *Bordetella pertussis* toxin PTX) was injected intraperitoneal (IP) on days 0 and 2 post PLP immunization. The mice were divided into several groups: 1. prevention, where they were treated with 50 μg/mouse of SIMR1281 or SIMR1707 starting 15 days before the induction of EAE and continued every three days. 2. Prophylactic, mice were treated with 50 μg/moues of SIMR1281 or SIMR1707 starting from day of EAE induction and continued every three days until termination (usually between 40-45 days). 3. Therapeutic, where mice were treated with 50 μg of SIMR1281 or SIMR1707 from the days of disease development (usually between 8-10 post EAE induction), and continued every three days until termination. The procedure for these regimens is shown below:

A. Prophylactic regimen: Mice were injected IP with 50 μg/mouse every 3 days since the initiation of the disease and until termination.

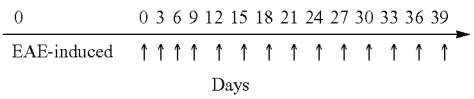

B. Therapeutic regimen: Mice were injected IP with 50 μg/mouse every 3 days at the appearance of symptoms (usually 10-12) days after initiation of the disease and until termination.

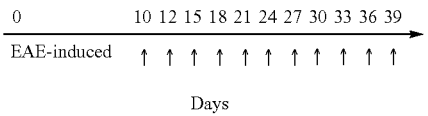

C. Prevention: The mice were injected IP with 50 μg/mouse of SIMR 1707 or 1281 at days −15, −10, −5, and 0. EAE was induced at day 0.

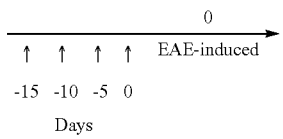

Untreated mice or mice injected with DMSO as a vehicle were used. For positive group, the results regarding the effects of RTX were used. During the course of the EAE disease, the animals were independently observed and monitored daily, and the EAE clinical score was recorded according to the following scoring scheme: 0=no clinical disease, 1=tail flaccidity, 2=hind limb weakness, 3=hind limb paralysis, 4=forelimb paralysis, and 5=moribund or death. The body weight changes were also monitored for all the mice groups. After the termination of the experiment, the mice were sacrificed, and their brains were collected for histological and immunohistochemistry analysis. Our findings indicate that for the mice treated with 50 μg of SIMR1281, there was a significant decrease in the EAE clinical scores as compared to vehicle or untreated mice in all three regimens utilized, i.e. prophylactic (FIG. 3A), therapeutic (FIG. 3B) or prevention (FIG. 3C). However, SIMR 1707 was only effective when used prophylactically or therapeutically but not when used in the prevention regimen.

Prophylactic, Therapeutic and Preventive Treatment in Mice

Figure 3A:
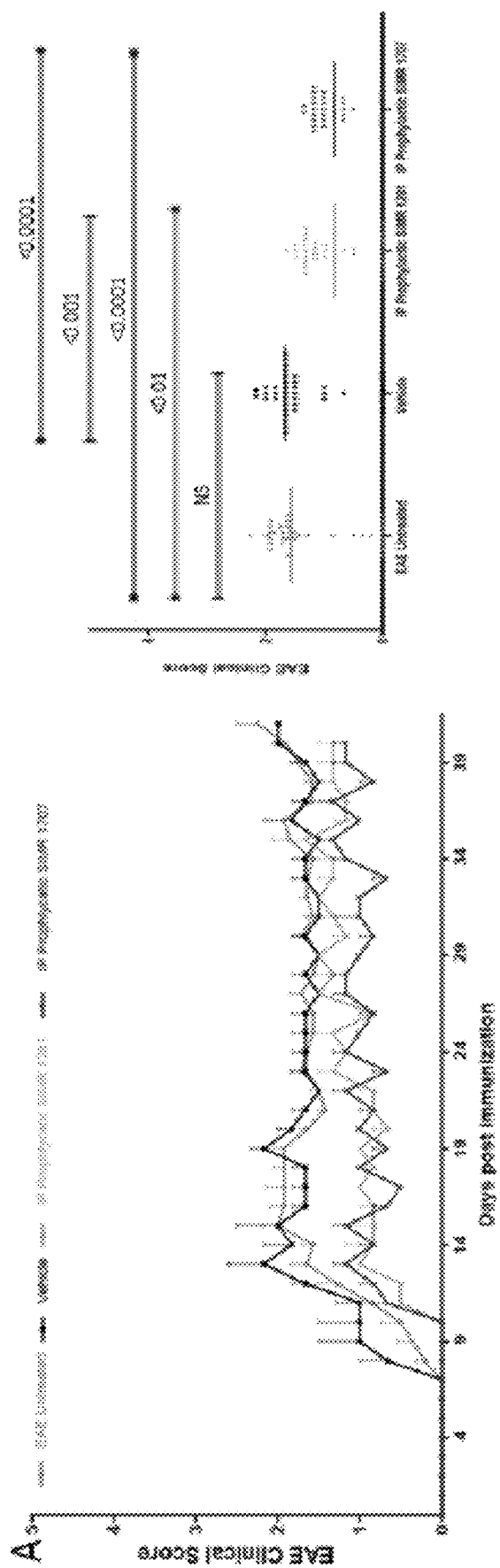
FIG. 3A illustrate intraperitoneal (IP) prophylactic, therapeutic and control treatments with SIMR compounds SIMR-1281 and SIMR-1707.
Figure 3B:
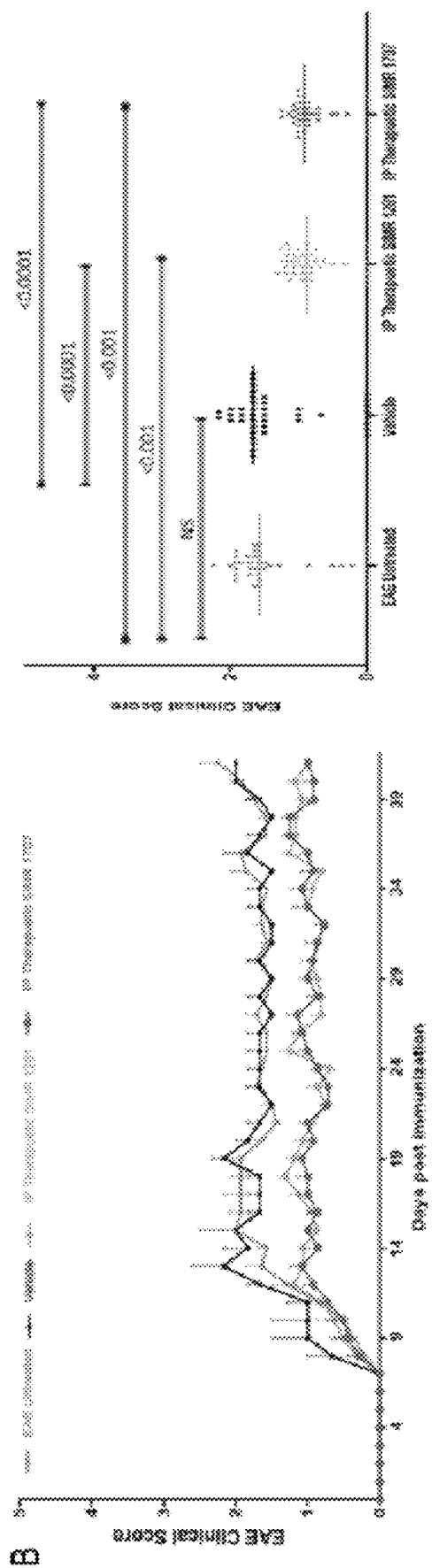
FIG. 3B illustrates intraperitoneal (IP) therapeutic treatment with SIMR compound.
Figure 3C:
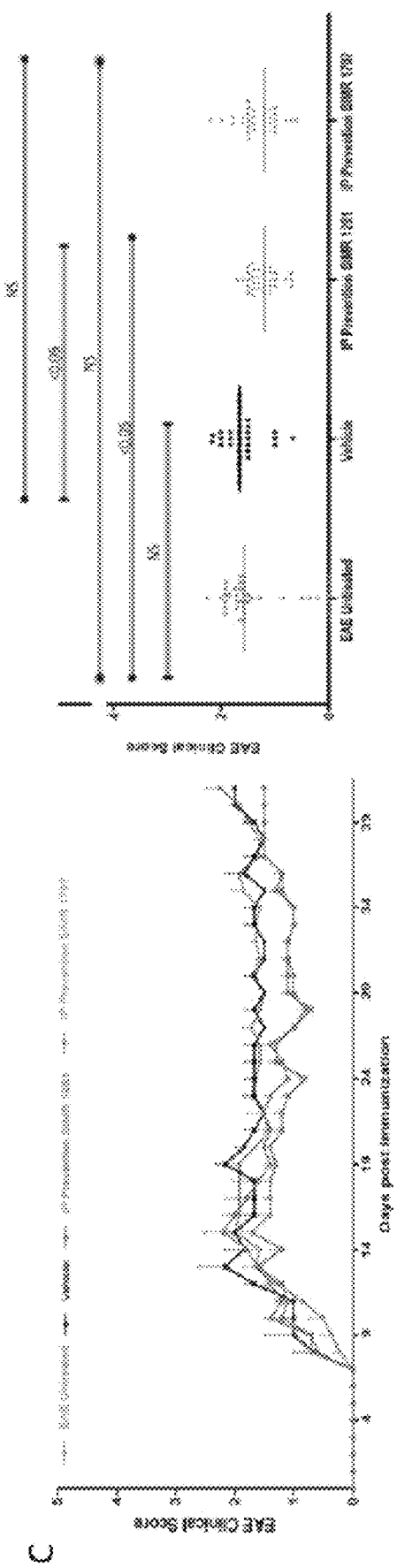
FIG. 3C illustrate illustrates SJL/J female mice either left untreated (red line), injected IP with vehicle (black line), or 50 μg/mouse SIMR compound 1281 (purple line) or compound SIMR-1707 (grey line) on days −15, −10, −5 and 0.

FIG. 3A illustrates intraperitoneal (IP) prophylactic treatment with compounds SIMR-1281 and SIMR-1707. SJL/J mice were induced to develop EAE (red line). Mice also received 50 μg/mouse of SIMR-1281 or SIMR-1707 IP at the start of disease induction and continued every three days until the termination of the experiment (orange and blue line, respectively). P values comparing the clinical scores among EAE untreated mice (red), vehicle injected mice (black line) and SIMR-1281 treated mice (orange line) or SIMR-1707 treated mice (blue line) are shown in the right panel using Sidak's multiple comparison test. FIG. 3B illustrates intraperitoneal (IP) therapeutic treatment with SIMR compounds. SJL/J mice were induced to develop EAE (black line). Mice also received 50 μg/mouse SIMR-1281 (green line) or SIMR-1707 (pink line) upon first sign when the disease appears usually on day 10 or 12 after disease induction and continued every three days until the termination of the experiment. Significant values are shown in the right panel. FIG. 3C illustrates SJL/J female mice either left untreated (red line), injected IP with vehicle (black line), or 50 μg/mouse SIMR compound 1281 (purple line) or compound SIMR-1707 (grey line) on days −15, −10, −5 and 0. At this time, EAE was induced in these mice and clinical scores were measured every day until termination. Significant values shown in the right panels compared the EAE clinical scores among the various groups, using Sidak's multiple comparison test. For comparison, the inventor used Rituximab (RTX), an off-label drug that has been extensively used in various centers around the world to treat MS patients (2-11). In these experiments, RTX only worked in the prevention regimen, particularly when used at high concentration, i.e. 20 μg/mouse. In contrast, RTX did not exert significant differences when used as a prophylactic drug or as a therapeutic drug, as shown in FIG. 4.

Figure 4A:
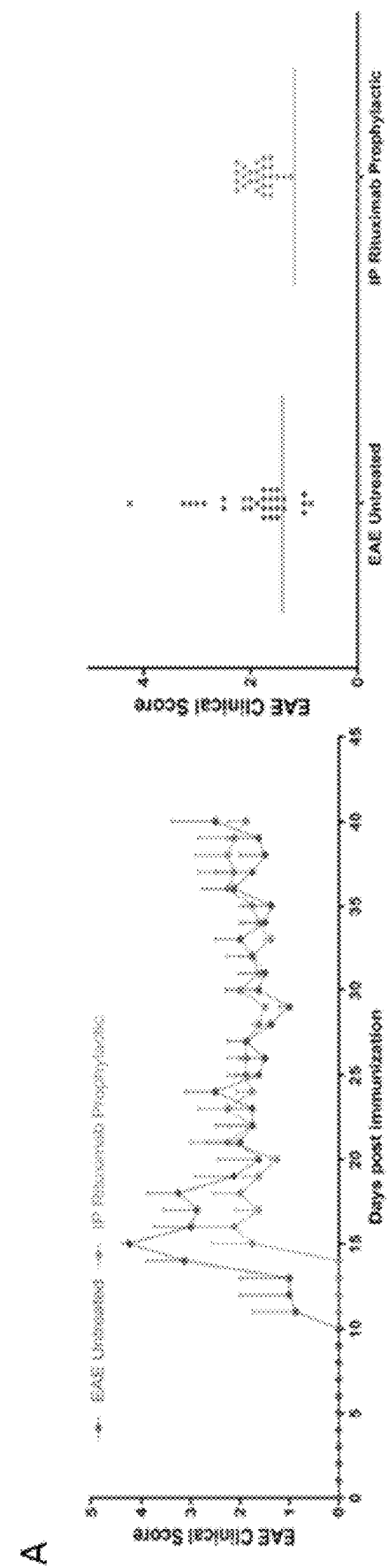
FIG. 4A illustrate SJL/J mice induced to develop EAE and controls.
Figure 4B:
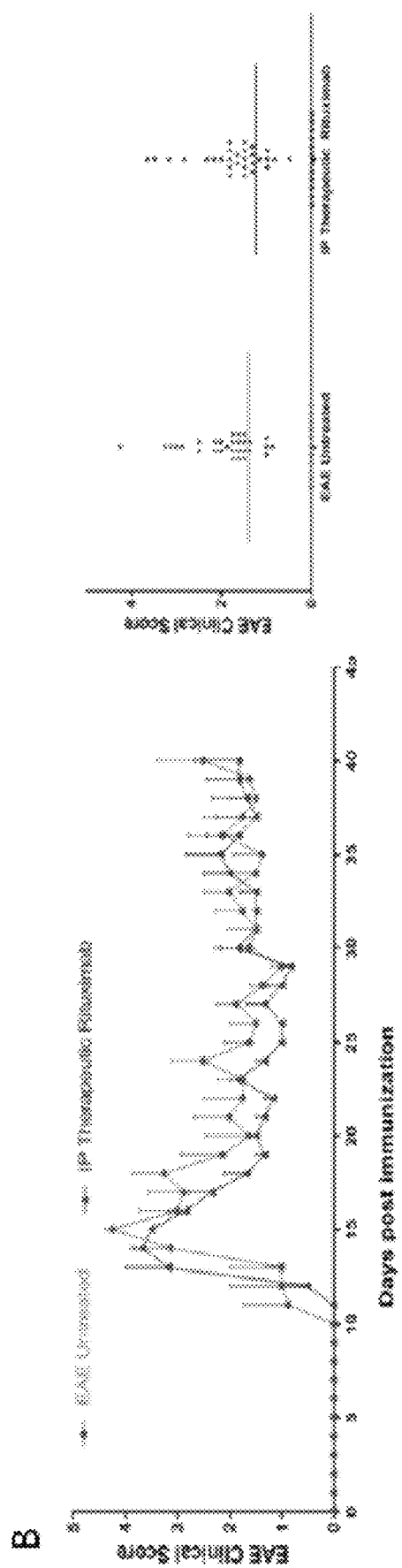
FIG. 4B illustrates SJL/J mice induced to develop EAE (grey line)
Figure 4C:
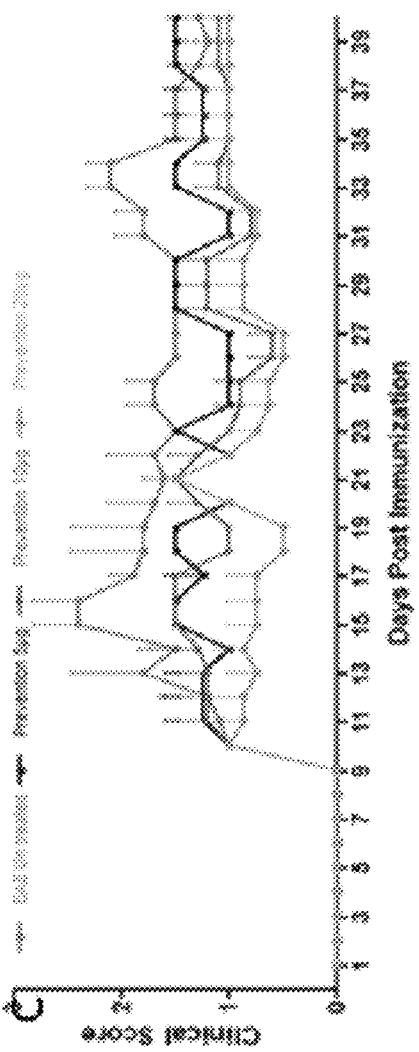
FIG. 4C illustrate SJL/J female mice either left untreated (red line), injected IP with 5 μg/mouse (black lines), 10 μg/mouse (blue lines) or 20 μg/mouse (grey line) on days −15, −10, −5 and 0
Figure 4C:
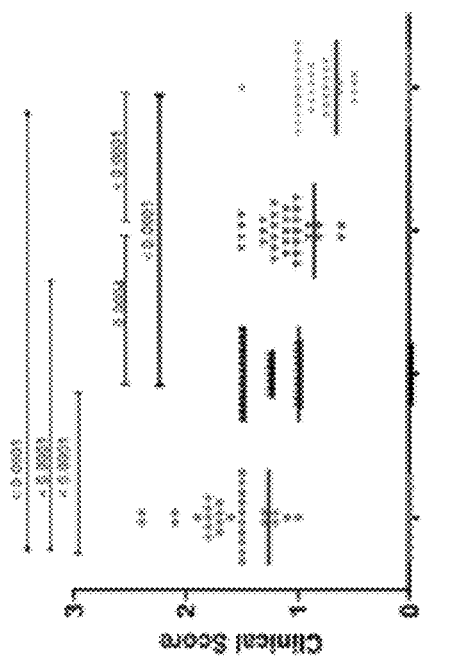

As illustrated in FIG. 4A, SJL/J mice were induced to develop EAE (grey line). Mice also received 5 g/mouse RTX IP at the start of disease induction (day 0) and continued every three days until the termination of the experiment (orange line). FIG. 4B illustrates SJL/J mice induced to develop EAE (grey line). Mice also received 5 μg/mouse RTX IP upon first sign of disease appears usually on day 10 or 12 after disease induction and continued every three days until the termination of the experiment (blue line). FIG. 4C illustrates SJL/J female mice either left untreated (red line), injected IP with 5 μg/mouse (black lines), 10 μg/mouse (blue lines) or 20 g/mouse (grey line) on days −15, −10, −5 and 0. At this time, EAE was induced in these mice and clinical scores were measured every day until termination. Significant values shown in the right panels compared the EAE clinical scores among the various groups, using Sidak's multiple comparison test. Further, we examined the body weights of these mice, as a sign of health improvement. The results showed that none of the treatments with compounds SIMR-1281 or SIMR-1707 reduced the body weight. In fact, they have significantly increased the weights of these mice during the course of the experiments as shown in FIG. 5. These findings strongly suggest that these compounds are safe and do not adversely affect the health of the animals.

Figure 5A:
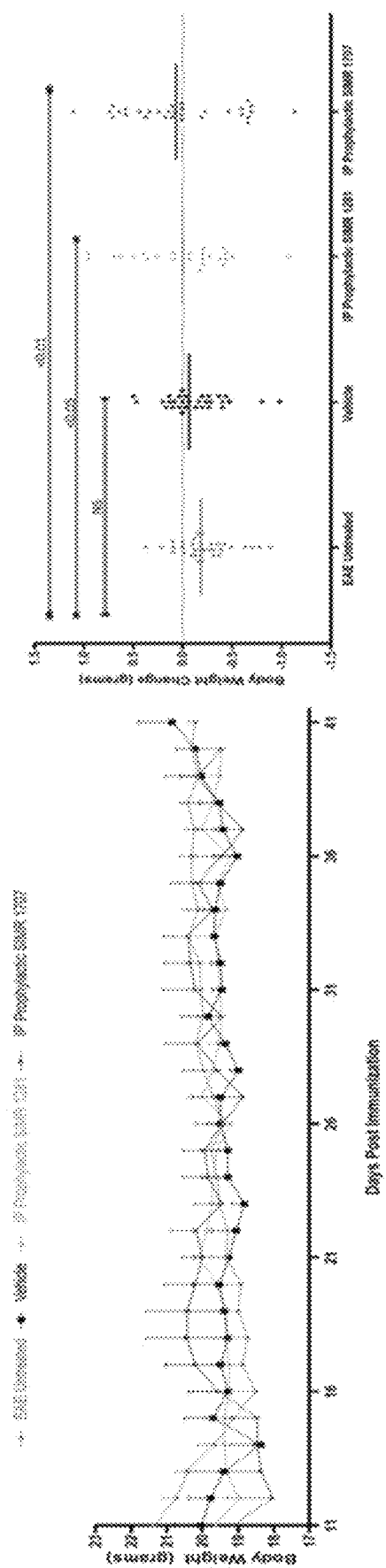
FIG. 5A illustrates the weights of mice after prophylactic regimen
Figure 5B:
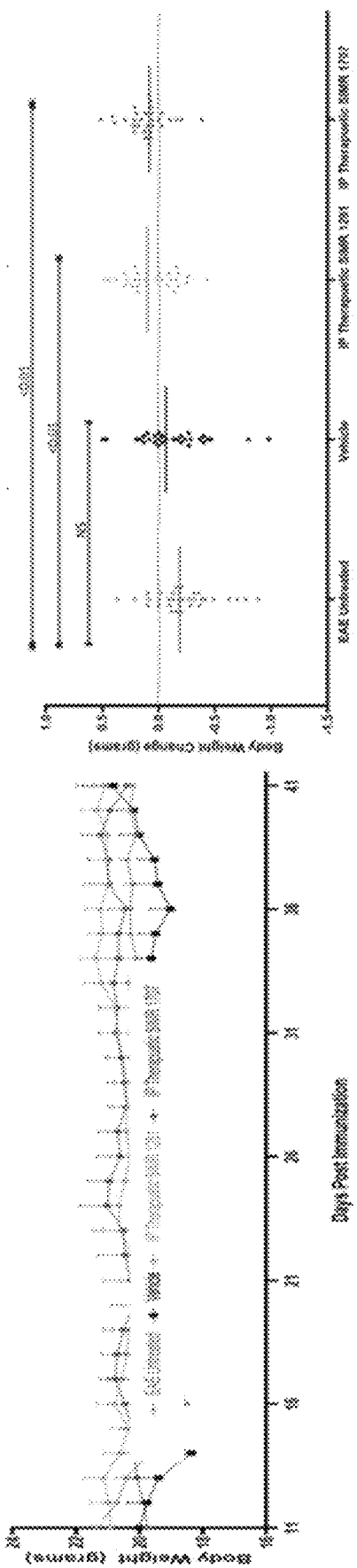
FIG. 5B illustrates the weights of mice after therapeutic regimen
Figure 5C:
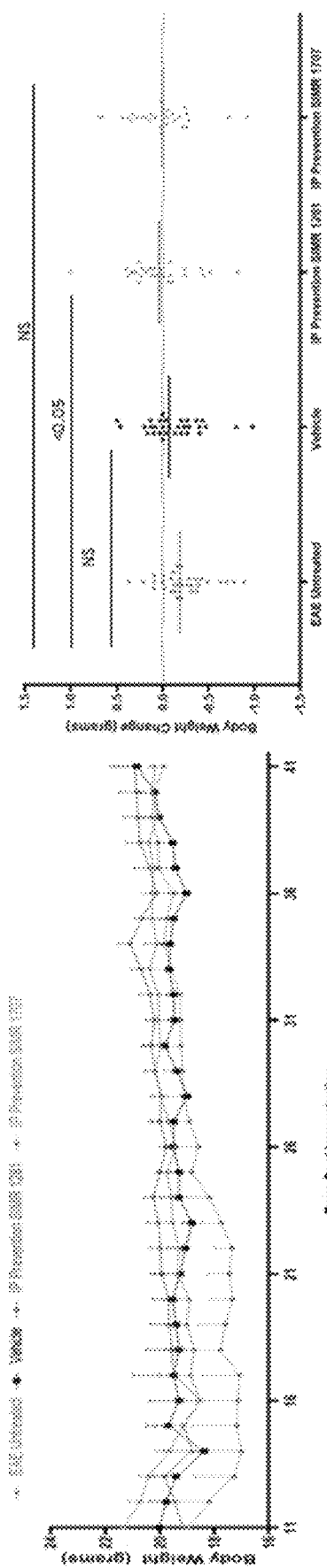
FIG. 5C illustrates the weights of mice after prevention regimen
Figure 6:
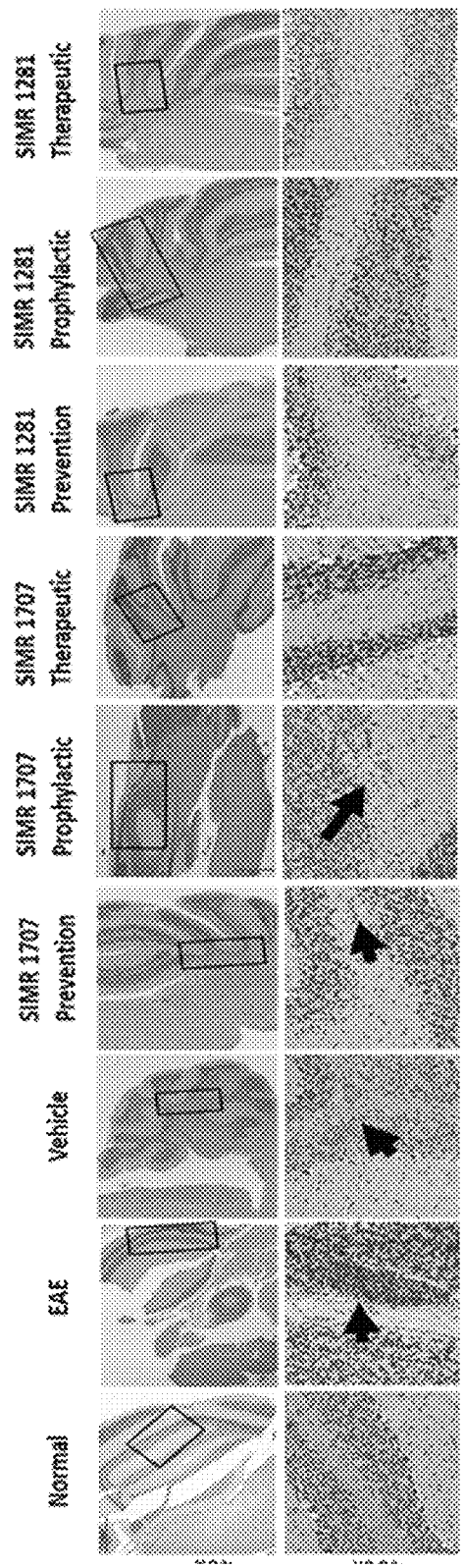
FIG. 6 illustrates H&E staining of mice cerebellum (rectangles) showing highly inflamed lesions in EAE untreated and vehicle treated mice (arrows).

FIG. 5 illustrates the weights of mice measured every day through the course of the experiments, i.e. up to 45 days after the initiation of the disease. FIGS. 5A, 5B and 5C, show the weights of mice after prophylactic, therapeutic or prevention regimen, respectively. Significant values shown in the right panels compared the mice body weights among the various groups. To corroborate the results of clinical scores with histological evaluation, we performed immunohistochemistry analysis to evaluate the effects of the two drugs on the inflammation taking place in the brain. First, we stained the brain cerebellum of these mice with H&E to evaluate the degree of inflammation. As shown in FIG. 6, the EAE untreated mice brains showed evidence of a heavy inflammation (arrows). Mice treated with SIMR-1707 in the prevention and prophylactic regimens showed minimal evidence of perivascular inflammatory infiltrates. Moreover, mice treated with therapeutic regimen of SIMR-1707 showed no evidence of perivascular inflammatory infiltrates. On the other hand, mice treated with SIMR-1281 in all therapeutic regimens including prevention, prophylactic and therapeutic showed no evidence of any perivascular inflammatory infiltrates. The histological pictures of the latter mice showed similar patterns to that seen in normal healthy mice group as shown in FIG. 6.

FIG. 6 illustrates H&E staining of mice cerebellum (rectangles) showing highly inflamed lesions in EAE untreated and vehicle treated mice (arrows). There was less inflammation in mice treated prophylactically or preventively with SIMR-1707 (black arrows). However, such inflammation completely disappeared when SIMR-1707 was used therapeutically. In contrast, treatment with SIMR-1281 resulted in no inflammation regardless of the regimen used. Further, infiltration of CD3 cells into the mice cerebellum stained with anti-CD3 was performed. SIMR-1707 prophylactic regimen was able to partially reduce the number of CD3$^+$ T lymphocyte infiltration. However, mice treated with SIMR-1707 in a therapeutic regimen showed no evidence of any CD3$^+$ T lymphocyte infiltration. Intriguingly, using SIMR-1281 in all regimens (prevention, prophylaxis and therapeutic regimens) showed no evidence of CD3$^+$ T lymphocyte infiltration as shown in FIG. 7.

Figure 7:
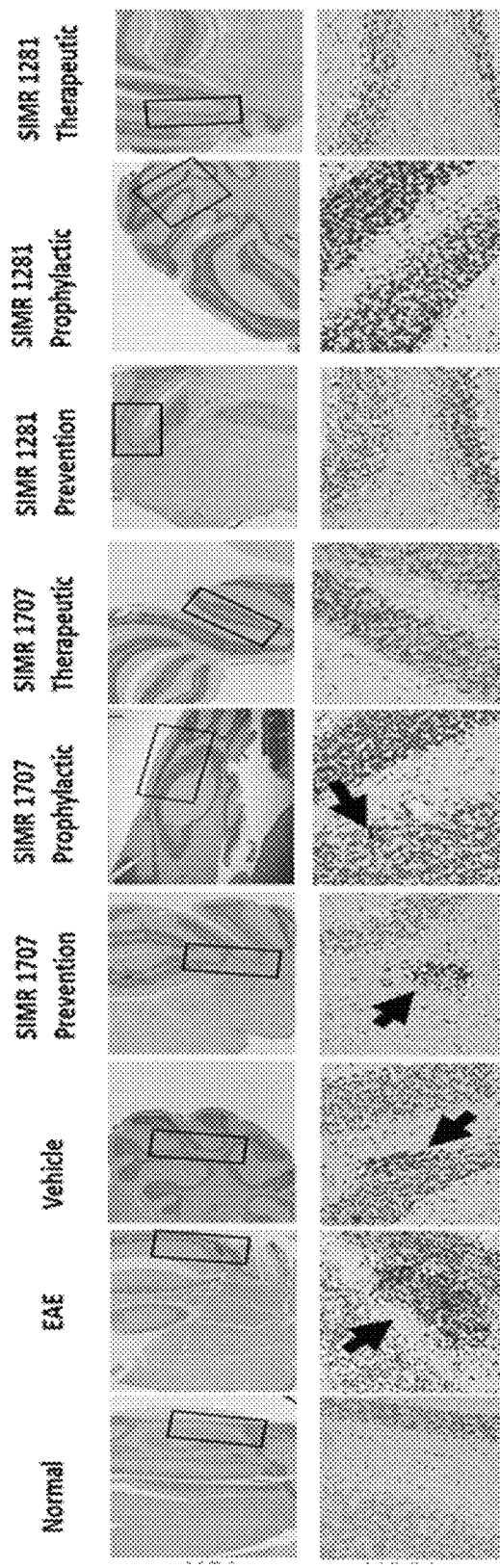
FIG. 7 illustrates infiltration of $CD3^+$ lymphocytes into the cerebellum of mice brains (rectangles or squares).

FIG. 7 illustrates infiltration of CD3$^+$ lymphocytes into the cerebellum of mice brains (rectangles or squares). EAE untreated or treated with vehicle showed extensive infiltration of CD3$^+$ T cells into the cerebellum of these mice (arrows). Similar to the H&E staining there was less infiltration of CD3$^+$ T cells in mice treated prophylactically or preventively with SIMR-1707 (black arrows). However, such extravasation was completely disappeared when SIMR-1707 was used therapeutically. In contrast, treatment with SIMR-1281 resulted in no CD3$^+$ T cell accumulation regardless of the regimen used. To further investigate the effects of the drugs on brain inflammation, we examined the activation of glial cells by staining with GFAP which determines the degree of gliosis. We demonstrated that while SIMR-1707 prevention regimen resulted in only partial reduction in the expression levels of GFAP, its use in both prophylactic and therapeutic regimens led to a significant reduction in GFAP expression. On the other hand, SIMR-1281 used in all regimens resulted in a significant reduction of GFAP staining, to levels almost similar to what is seen in the normal mice group as shown in FIG. 8.

Figure 8:
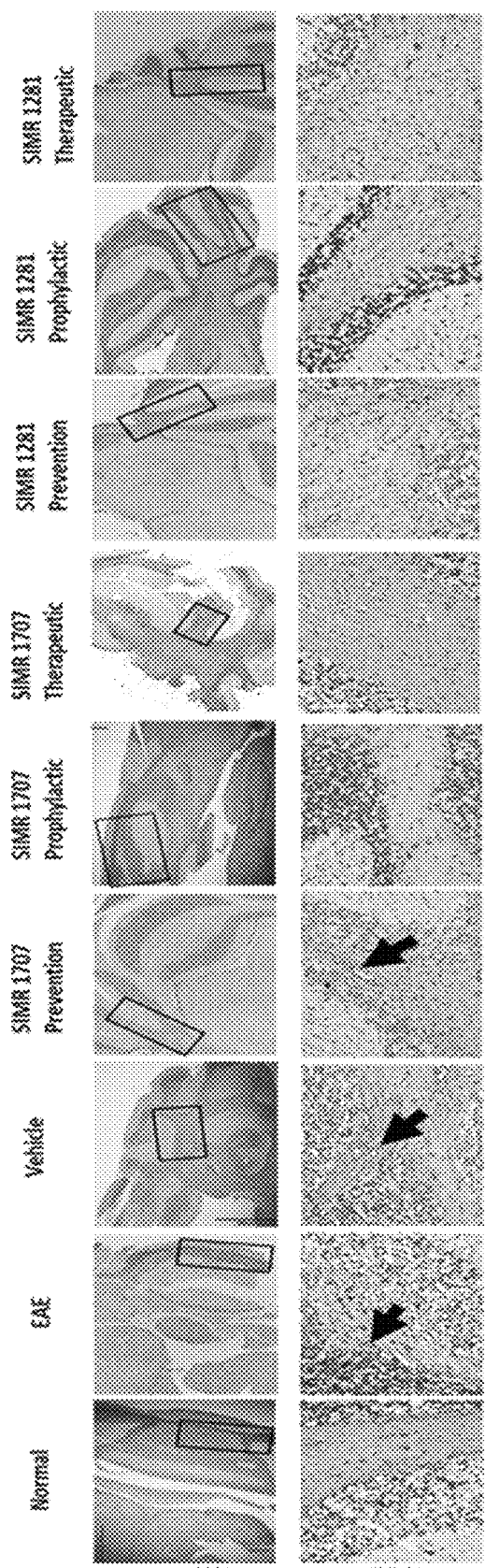
FIG. 8 illustrates mouse brain cerebellum (rectangles or squares) was stained with GFAP to determine the degree of glial cell activation.

FIG. 8 illustrates mouse brain cerebellum (rectangles or squares) was stained with GFAP to determine the degree of glial cell activation. EAE untreated and vehicle treated mice brains showed extensive gliosis (arrows). Less gliosis was observed with brains of mice treated preventively with SIMR-1707. However, no obvious glial cells activation was observed when SIMR-1707 was used prophylactically or therapeutically. In contrast, SIMR-1281 was so robust in preventing gliosis in all three regimens used. Finally, we stained the mice brain cerebellum with Luxol fast blue to determine the degree of re-myelination after treatment with the two drugs. We observed that mice treated with SIMR-1707 prevention and prophylactic regimens showed partial improvement in re-myelination. In contrast, when SIMR-1707 was used in a therapeutic regimen, it exerted a significant reduction in the demyelination areas. However, when the mice were treated with SIMR-1281 in the prevention, prophylaxis or therapeutic regimen, the brain of these mice showed no evidence of demyelination with a picture similar to that seen in normal healthy mice as shown in FIG. 9.

Figure 9:
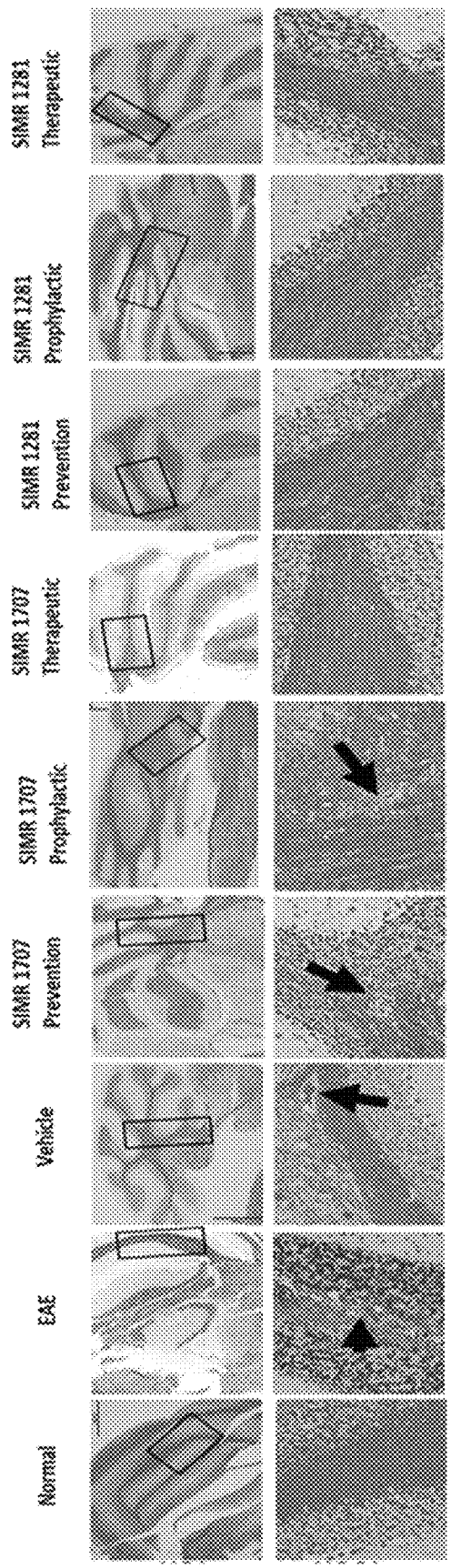
FIG. 9 illustrates clear demyelination in the cerebellum of mice brain developing EAE and left without treatment or treated with vehicle (arrows).

FIG. 9 illustrates clear demyelination in the cerebellum of mice brain developing EAE and left without treatment or treated with vehicle (arrows). On the other hand, mice treated with SIMR-1707 prevention or prophylactic regimens showed partial improvement in demyelination, i.e. some demyelination was still obvious (arrows). However, SIMR-1707 therapeutic regimen showed a significant reduction in the demyelination. SIMR-1281 treated mice showed a clear re-myelination in the prevention, prophylaxis and therapeutic regimens and demonstrated no evidence of demyelination with a picture similar to that seen in normal healthy mice.

What is claimed is:

1. A method of treating multiple sclerosis in a subject, comprising administering to the subject in need thereof a therapeutically effective amount of formula II, or a pharmaceutically acceptable salt thereof:

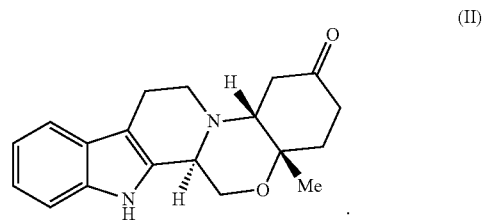 [SMILES: C[C@]12CCC(=O)C[C@H]1N1CCc3c([nH]c4ccccc34)[C@@H]1CO2]

(II)

2. A method of treating multiple sclerosis in a subject, comprising administering to the subject in need thereof a therapeutically effective amount of the compound, a pharmaceutically acceptable salt thereof, of claim 1, and one or more pharmaceutical excipients.

3. The method of claim 2, wherein the subject is a mammal.

4. The method of claim 3, wherein the mammal is a human.

5. A method of prophylactically treating a subject for multiple sclerosis, comprising administering to the subject in need thereof a therapeutically effective amount of formula II, or a pharmaceutically acceptable salt thereof:

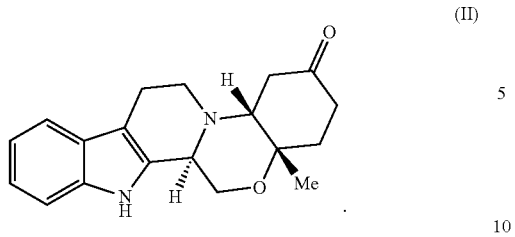
(II)

6. A method of prophylactically treating a subject for multiple sclerosis, comprising administering to the subject in need thereof a therapeutically effective amount of the compound, a pharmaceutically acceptable salt thereof, of claim 5, and one or more pharmaceutical excipients.

7. The method of claim 6, wherein the subject is a mammal.

8. The method of claim 7, wherein the mammal is a human.

\* \* \* \* \*